Figure 1:
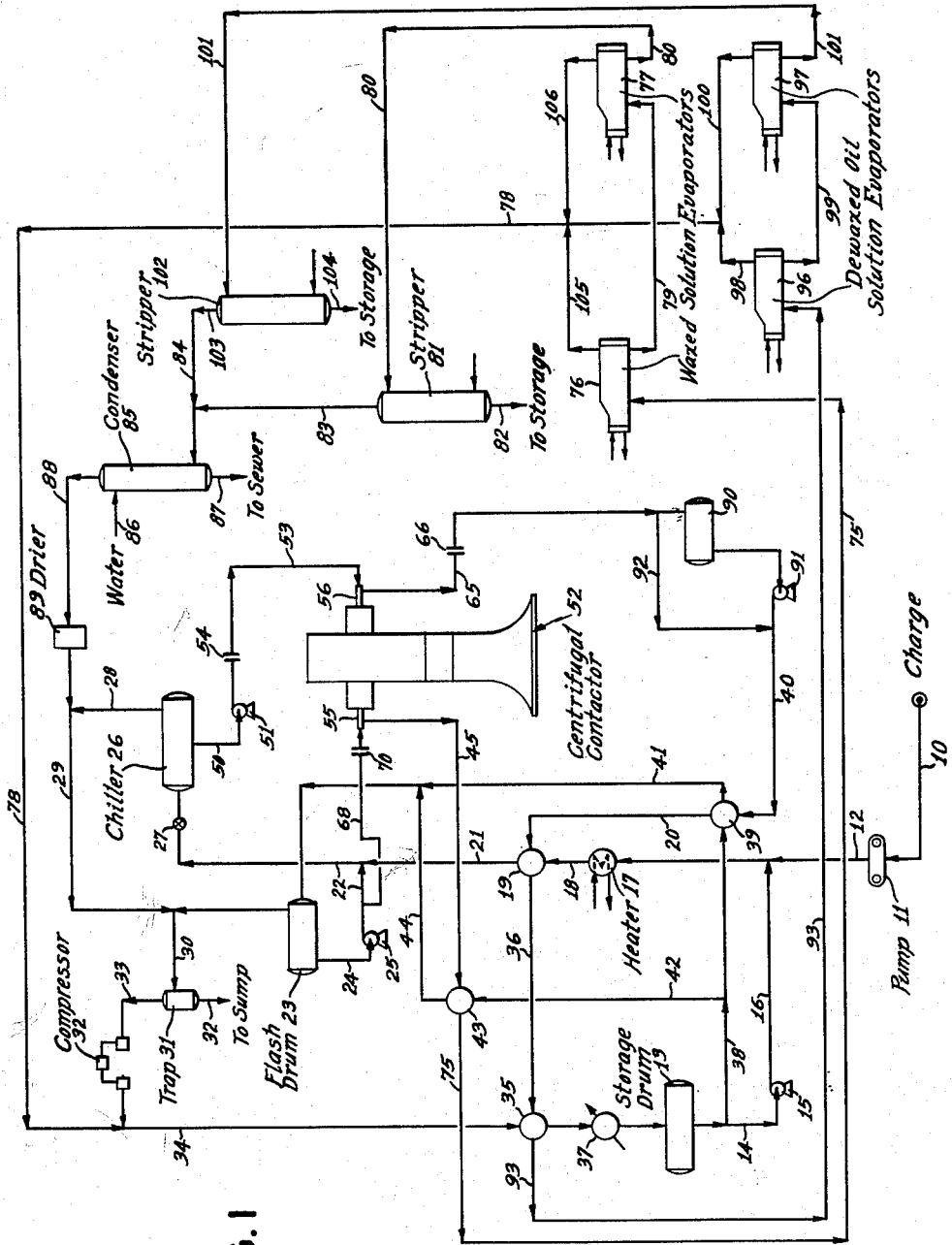

Dec. 10, 1963 T. W. PRATT 3,113,920
METHOD FOR DEWAXING LUBRICATING OIL
Filed Jan. 16, 1958 2 Sheets-Sheet 1

INVENTOR.
THOMAS W. PRATT
BY
G.H. Palmer
V.F. Davies
ATTORNEYS

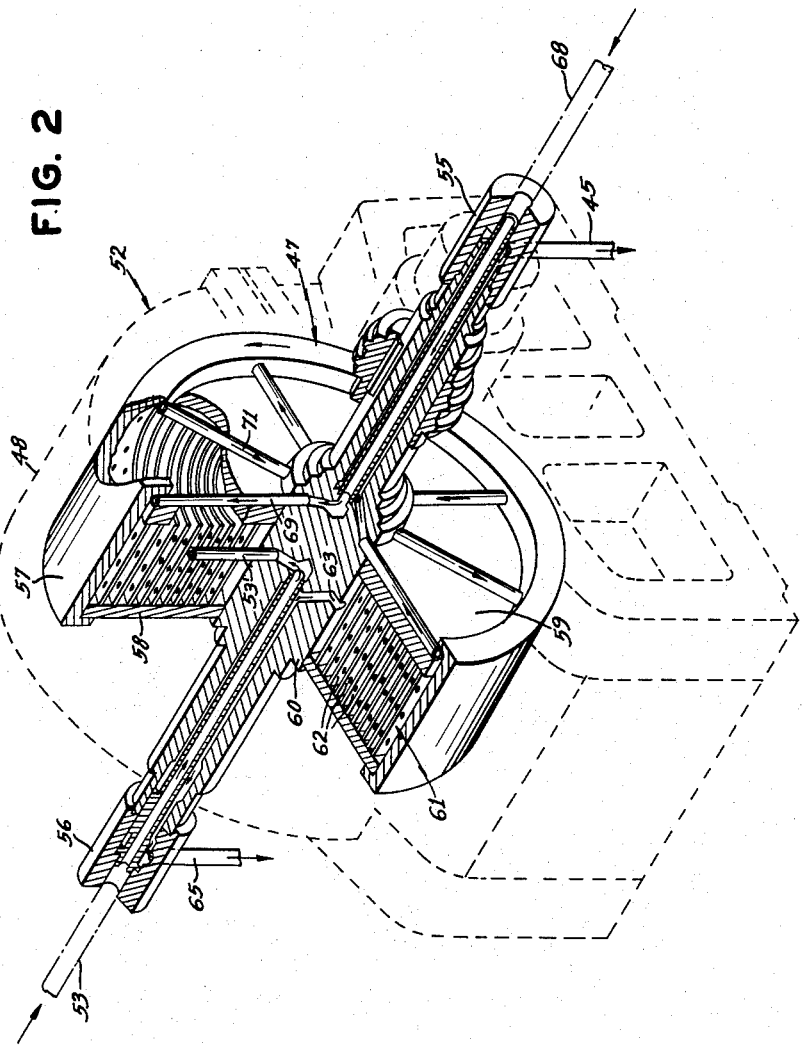

3,113,920
METHOD FOR DEWAXING LUBRICATING OIL
Thomas W. Pratt, Rutherford, N.J., assignor to The M. W. Kellogg Company, Jersey City, N.J., a corporation of Delaware
Filed Jan. 16, 1958, Ser. No. 709,354
2 Claims. (Cl. 208—33)

This invention relates generally to the separation of high melting point material from oils and particularly to the crystallization and separation of wax and wax-like solids from liquid oil bearing the same and most importantly to the dewaxing of lubricating oils.

It has long been established practice in the manufacture of lubricating oils suitable for cold climate service to remove all solids precipitating out of the oil at a preestablished minimum temperature. The procedures commercially employed for dewaxing lubricating oils involve low temperature crystallization of the wax components of the oil and the separation of the crystallized wax components from the oil by a filtering or a centrifuging operation. One of these commercial procedures is propane dewaxing. This procedure employs propane as the solvent and as the medium for reducing the oil, by autorefrigeration, to the preestablished wax crystallization temperature. The propane dewaxing process has many advantages over other dewaxing processes, as for instance those employing other volatile solvents or a plurality of such solvents. The solvent, propane, employed is cheap and is usually readily available at the refinery and it boils at such a low temperature that it may advantageously be used in an autorefrigeration cycle. Lubricating oils may be treated with propane without material loss of viscosity index of the dewaxed oil and the investment cost for plant and associated equipment is low as is the cost of operating the plant. In spite of these advantages, propane dewaxing has not gone into universal use. This is due primarily to the fact that it is found necessary to carry out the wax crystallization step as a batch operation in order to obtain wax crystals of a size, density, and form to provide a high filtration rate. The batch chilling and crystallization step complicates operating techniques since nonuniformity from batch to batch is the rule and increases plant cost as well as operations cost. Crystal size, density and form are critical both when the separation of the wax from the oil is effected as a filtering operation, as well as when it is effected as a centrifugal operation. A dense, uniform, medium size crystal grain which is granular in character provides the best separation of wax from the mother liquid. Flash chilling of the propane-oil solution or even a gradual chilling operation which includes one or more rapid pressure drops produces wax crystals which are very small and unsatisfactory since the normal crystals are destroyed in the process of flashing at the point of pressure release. The wax crystals produced by flash chilling or shock chilling, are so extremely small that they either pass through the filter cloth or plug it, or when the slurry is centrifuged proper separation does not take place. In an effort to improve the propane dewaxing process it has been proposed to provide continuous auto-chilling of the propane-oil solution in which the chilling is controlled by the pressure drop occurring as the solution passes through a pipe so as to meet the requirements of gradual release of pressure with slow, or controlled, evaporation of the solvent in order to obtain the desired easily separable wax crystals. The chief drawbacks of this proposal are the enormous lengths of pipe required for the required pressure drop, the difficulty of disposing of the propane vapors at intermediate points in the chilling pipe and the inflexibility of throughput and chilling pattern once they are established. It has also been proposed to effect the auto-chilling of propane-oil solution by evaporation of propane under a continuously decreasing static head to provide for a smooth chilling curve which is largely controllable to a desired time-temperature pattern. A vessel 60 feet high would provide for only a 12 p.s.i. static head. On this basis approximately 900 feet of standpipe would be required. This together with the necessary instrumentation renders the apparatus impractical both as to size and cost.

The filtering operation even when wax crystals are of ideal size and character, is comparatively slow and in order to handle the capacity of the usual commercial propane dewaxing plant, a battery of filters is required which may include seven or more filters all of which are complicated and expensive. Since propane boils at minus 40° F. it is necessary to encase each filter in an expensive pressure shield. The cost of the filter battery represents one of the major items of cost of the dewaxing plant. The space requirements of the filter battery are excessive when compared with the rest of the plant and since for satisfactory operation it has been found necessary to provide for gravity drain from the filter outlets, the filters must be located above grade in the second story of the filter house, thus materially increasing the cost of the filter house. Thus, the total cost of the filter installation is excessively high and represents over 25 percent of the total cost of the dewaxing plant.

It is a principal object of this invention to provide a propane dewaxing process which involves a minimum of capital investment for plant and equipment and involves a minimum of operational costs.

It is also a principal object of this invention to provide a propane dewaxing process in which the batch crystallization of the wax and the filtering of the wax-oil slurry as well as the apparatus required for these results, are eliminated, and in lieu thereof the wax crystallization is continuously effected by controlled autorefrigeration of the propane-oil solution and the wax is removed from the wax-propane slurry by a combined contact and centrifuging operation; the wax crystallization and the wax separation being carried out in single high capacity apparatus of moderate cost.

It is a further principal object of this invention to provide a propane dewaxing process in which a propane-oil solution is continuously flashed at a controlled rate to crystallize the wax content thereof in the form of particles of a density appreciably higher than that of the liquid phase of the resulting slurry, the slurry is continuously passed through an elongated separation zone in contact with an extended surface while under the influence of centrifugal force sufficient to multiply the density difference progressively along said zone so as to readily permit progressive separation of the liquid phase from said slurry as it moves through said zone and continuously removing the solid, substantially dry wax from the end of said zone. It is an additional principal object of this invention to supply oil free propane as a wash liquid to said zone adjacent the region thereof where the centrifugal force is a maximum and to flow said propane countercurrently through the wax and wax-propane slurry to thereby wash from said wax the oil carried therewith, whereby the solid wax removed from said zone is substantially oil free. It is also a further principal object of this invention to supply the oil free wash propane to the high centrifugal force end of said zone in such large controlled quantities that a sufficient proportion thereof will flow concurrently with the wax to form therewith a large particle size wax-propane slurry so that the wax removed from said zone will be in the form of large, dense, easily separable crystals suspended in a substantially pure propane liquid phase.

The further objects, features and advantages of the invention will become apparent from a consideration of the following detailed description of a preferred embodiment thereof.

In accordance with the present invention, the wax containing material is intermixed with a quantity of propane sufficient to completely dissolve said material and to provide a propane solution of a viscosity such that it may easily be circulated through the processing equipment. When necessary, the wax containing material-propane mixture is heated to moderately elevated temperatures to cause complete solution. The propane-waxy material solution is then diluted by introducing therein a quantity of liquid propane at a reduced temperature to lower the temperature of the solution to a point approaching that at which separation of the wax content is to take place and to render it sufficiently fluid for circulation at the reduced temperature. By reason of the cold propane, additional shock chilling of the solution is effected. This causes crystallization of at least some of the wax content of the solution. The cold slurry thus produced is flash chilled to reduce its temperature to about the boiling point of propane at atmospheric pressure. The flash chilling results in the crystallization of the remainder of the undesired wax content of the original waxy material charge. The vaporized propane from the flash chilling step is recompressed and after being cooled is returned to the process for further use.

The propane solution-crystallized wax slurry produced by the flash chilling step is supplied at a controlled rate to a separation zone wherein said slurry while under elevated pressure contacts an extended surface while it is subjected to progressively increasing centrifugal force. In its flow through said zone, said slurry continuously and along substantially the full length of said zone has liquid phase content thereof separated therefrom. The separated liquid phase is continuously removed from said zone and is a propane solution containing the dewaxed original charge material. The wax content of said slurry progressively concentrates as it moves along said zone due to the removal of the liquid phase therefrom and is present at the end of said zone as a substantially solid mass of wax. For removal of unwanted oil from said wax, a controlled quantity of cold, substantially oil free propane is supplied to the high centrifugal force end of said zone and is caused to flow in a direction counter to the direction of flow of the wax so that the wax is washed and oily components removed therefrom. By controlling the flow of dewaxed oil from said zone, the washing of the wax is controlled. In accordance with one aspect of the invention, the propane washing of the wax may be omitted. In accordance with another aspect of the invention, the quality of wash propane may be so increased and the back pressure so controlled that the wax does not form a solid compact mass but remains as a suspension in part of the wash propane and exists from said zone in the form of a slurry. In the latter case, the propane may be removed from the wax as by decanting, evaporation, etc. The propane solution containing the dewaxed original charge material after leaving said separation zone is subjected to evaporation for removal of the propane from the dewaxed original charge material. The wax after removal from said separation zone is likewise subjected to a process for removal of propane therefrom by evaporation. The removed propane is returned to the system for reuse.

It would be understood that in its broadest application the present invention might be employed for the purpose of removing relatively high melting point substances from other oils, for example, for separating stearic acid from mixtures of oleic and linoleic acids, etc. Furthermore, in its broadest aspects the invention includes a generic process which is not limited to the specific mode of wax crystallization above indicated but contemplates the removal of wax from a slurry regardless of the manner in which the crystallization is effected. It will be further understood that although propane is the commercial solvent generally used other normally gaseous hydrocarbon solvents or mixtures of normally gaseous hydrocarbons may be employed if the economics justify them and the conditions are shifted to account for their different physical properties. Generally, however, the preferred application of this invention is to the dewaxing of petroleum lubricating oils, particularly those generally subjected to propane dewaxing such as oils ranging in weight from SEA 10, to residual bright stocks and cylinder oils.

A typical embodiment of the invention is illustrated in the accompanying drawings, in which:

FIG. 1 is a flow diagram of a system for carrying the invention into practice, and FIG. 2 is an enlarged isometric view, partly in section illustrating an apparatus element shown in FIG. 1.

In the flow diagram the most important elements of the system are identified by legend. The waxy oil charge, which may be any liquid material containing wax or wax-like components as for instance, a waxy oil distillate such as a lubricating oil stock having a pour point of 100° F., is passed from the charge supply line 10 to the oil charge pump 11 and into the line 12 at a pressure sufficient to assure its flow through the initial elements of the system. The waxy oil charge is generally at a temperature above ambient and preferably at a temperature high enough to maintain the bulk of the charge in the liquid state and sufficiently fluid for circulation. With a lube oil stock of a pour point of 100° F., a temperature of about 174° F. is sufficient for the purpose. Liquid propane at a temperature above ambient is passed from the propane storage drum 13, through the line 14 to the pump 15 and from thence through the line 16 to the line 12 to intermix with the waxy oil charge flowing therethrough. About a half a volume of propane for each volume of waxy oil charge is thus supplied. The purpose of this propane addition is to provide a propane-oil solution with sufficient solute to assure complete solution therein of the whole of the waxy oil charge. The proportion of propane supplied will be varied from 0.2 volume to 1.0 volume per volume of waxy charge as the character of the waxy charge warrants so as to assure the complete solution of the charge as indicated. The propane-waxy oil mixture is then passed through the charge solution heater 17, wherein its temperature is raised by indirect heat exchange with exhaust steam as required to assure complete solution. With the charge indicated, the raising of the temperature to 150° F. is ample for complete solution of the charge in the propane. From the solution heater 17 the propane-oil solution flows through the line 18 into the solution cooler 19, wherein by indirect heat exchange with the cold dewaxed oil solution flowing through line 20, its temperature is reduced to a temperature within the range of about 80° to about 100° F. The purpose of this heat exchange step is to reduce the refrigeration load and the heat demand load of the system.

From the solution cooler 19 to waxy oil-propane solution flows through the line 21 into the line 22, wherein it is intermixed with a large proportion of cold propane derived from the cold propane flash drum 23 through the line 24 and the pump 25. A sufficient quantity of propane is introduced into the waxy oil-propane solution at this point to assure the crystallization of all of the unwanted waxy materials in the subsequent flash chilling operation and the flow of the resulting wax slurry through the elements of the system. For this purpose, approximately five volumes of propane for each volume of oil are found sufficient. It is, of course, understood that the proportion of propane to oil will be varied as the characteristics of the waxy oil charge require; the ratio of the propane added to the oil may range from 2.0 to 7.0. The cold propane derived from the flash drum 23 is at −40° F., the boiling point of propane at atmospheric pressure, and when it is intermixed with the waxy oil-propane solution, rapidly cools said solution and causes shock chilling thereof with a concomitant crystallization of some of the wax content thereof. The wax usually crystallizes as small size crystalls which nevertheless are appreciably heavier than the liquid in which they are suspended. The temperature of the resulting slurry will depend on the proportion of cold propane added and will usually approach the boiling temperature of the propane. With the proportions here employed the slurry temperature will be about −15° F. The line 22 conducts the cold propane-waxy oil slurry to the flash chiller drum 26, wherein it is flashed to atmospheric pressure to lower the temperature thereof to the boiling point of propane, −40° F. Line 22 includes a valve 27 through the manipulation of which the flash chilling operation may be controlled. During the flash chilling operation and subsequently thereto the remainder of the wax content is crystallized to thereby form a slurry whose solid phase is the total unwanted wax content of the waxy charge and whose liquid phase is a propane dewaxed oil solution.

The propane vapor liberated in the flash chiller 26 flows through the pipe line 28, 29 and 30, to the compressor trap vessel 31, wherein any oil or other liquid, mechanically carried thereby is separated. The separated liquid material flows through the line 32 to a slop sump or other point of disposal. The propane vapor passes from separator 31 through line 33 to the propane compressor 32 whereat its pressure is raised as required to maintain it in the liquid condition at about 110° F., in propane storage tank 13. A pressure of about 250 pounds is required for this purpose. From the compressor 32 the hot pressurized propane vapor flows through the line 34 to the heat exchanger 35 wherein, through indirect heat exchange with the propane-dewaxed oil solution flowing through the line 36, its superheat is largely removed. Through this heat exchange the temperature of the propane-dewaxed oil solution is raised from about 90° F. to about 140° F. From the heat exchanger 35 the cooled compressed propane vapor passes through the condenser 37, wherein through indirect heat exchange with water it is condensed to the liquid state and flows as a liquid to the propane storage tank 13 at about 110° F.

The quantity of propane sufficient for the purposes of cold propane flash drum 23, in this case approximately six times the volume of the waxy oil charge, is passed from propane storage drum 13 through the line 38 to pass in part to the heat exchanger 39, wherein its temperature is reduced to below ambient, as for instance to about 10° F., by indirect heat exchange with the propane-dewaxed oil solution flowing through the line 40. Through this heat exchange the propane-dewaxed oil solution has its temperature increased to about 75° F. The purpose of this heat exchange is also for reduction of the refrigeration load of the system. From the heat exchanger 39, the propane flows through the line 41 for flashing within the drum 23. In order to further reduce the refrigeration load required by the system the other portion of the propane flowing through line 38 is diverted by line 42 and is caused to flow through the heat exchanger 43, for indirect heat exchange with the cold wax flowing through the line 45. Through this heat exchange the temperature of the propane is reduced to about 10° F., while that of the wax oil solution is raised from about −40° F. to about 75° F. The thus cooled propane flows through the line 44 which opens into the line 41 which carried the propane to the cold propane flash drum 23.

From the flash chiller 26, the propane-oil-wax slurry flows through the line 50 at about −40° F. to the pump 51 wherein its pressure is increased as required to pass it through the line 53 and through the centrifugal contactor 52. The line 53 includes a flow regulation control device 54 of conventional design so that the flow of the slurry into the contactor 52 may be adjusted as required to produce the desired results. The slurry in its passage through the centrifugal contactor 52 is separated into its solid and its liquid components and these separately removed. The centrifugal contactor 52 may be of any preferred construction but should include an elongated zone which is provided with extended contacting surface and is maintained at an elevated pressure while it is subjected to progressively greater gravity multiplying forces from one end to the other end thereof. The slurry is not permitted to flow freely through the centrifugal contactor device 52 but rather the outlets therefrom are controlled by maintaining back pressures sufficient to assure proper separation of the slurry components. The slurry in moving through the contacting zone as defined, due to the gravity multiplying effects, has the apparent weight of its components multiplied by progressively greater factors from one end of the zone to the other. This multiplication multiplies the difference in apparent weight of the components by the same factors so that materials which are difficultly separable under normal gravity conditions become easily separable in their movement through the zone. When the slurry is subjected to the effects of the separating zone, the heavier components, that is the wax, will move towards the region of greatest apparent weight multiplication and by so doing will displace liquid phase material and move it toward the region of low gravity effects. The separation is accelerated by the contact of the slurry and its components with the extended surface of the zone. The extended surface of the separating zone may be disposed as a spiral or as a plurality of concentrically arranged ring-like members. In any event, the extended surface defining member, or members, is perforated in a more or less regular pattern over the full extent thereof to provide for easy passage of the slurry and/or its separated components from one face to the other thereof.

A centrifugal contactor suitable for carrying out the wax separating step of the novel method of this invention, and the mode of operation of said contactor, are described at length in Patent 2,670,132, issued February 23, 1954. Referring now particularly to FIG. 2 of the drawings of this application, wherein the centrifugal contactor 52 suitable for the present invention and based on the disclosure of said patent, is shown in sufficient detail to understand the method steps carried out therein. It will be seen that the contactor 52 includes a rotor element 47 that is housed in a casing 48, which casing includes bearing elements for rotatably supporting the hollow trunnions 55 and 56 which carry the rotor 47. The rotor 47 is made up of a heavy outer ring element 57 that is carried by heavy discs 58 and 59, mounted on the hub 60 from which the trunnions 55 and 56 extend. The space defined by the discs 58 and 59 and the ring 57 constitutes the separation zone 61. The separation zone 61 has a plurality of perforated, comparatively closely spaced, thin ring partitions 62 disposed therein which are carried by the discs 58 and 59. The number of the partitions 62 and the spacing thereof are determined by the nature of the slurry and the character of the waxy material to be separated. Generally speaking, the more difficult the separation problem by reason of the smallness of the difference in specific gravity of the liquid phase of the slurry and the solid phase of the slurry, the greater number of partitions 62 and the closer the spacing. Means, not shown, are provided for rotating the trunnions 55 and 56 to rotate the zone 61 at a sufficient rate to multiply the effects of gravity from about 1000 to about 5000 times. With a zone 61 of a maximum diameter of about 48 inches, a rotation speed of about 2000 r.p.m. is sufficient for separating the slurry of the character produced in the flash chiller 26.

The slurry conducting line 53 opens into the center bore of the trunnion 56 and introduces the slurry at controlled rates through the plurality of radially disposed tubes 53', one only being shown but two or more being actually used, into the zone 61 at points substantially intermediate the hub 60 and the outer ring 57. The dewaxed oil-propane solution leaves the low gravity end of the zone 61 at the port 63 located on the surface of the hub 60 and flows into the line 65 through the annular passageway which surrounds the central bore of the trunnion 56. The line 65 includes a flow regulation control device 66 so that the outward flow of the dewaxed oil solution may be controlled. In one manner of performing the invention, separation of the wax component from the liquid component may be effected without washing the wax. However, it is usually preferred to propane wash the separated wax so as to remove therefrom any unwanted portions of the original charge. To this end the line 68 opens into line 22 and conducts cold liquid propane to the central bore of the trunnion 55. The thus introduced propane flows from said central bore to the outer high gravity end of the zone 61 through one or more conduits 69. The line 68 also includes a flow regulator control 70 so that the quantity of wash propane required for the desired results may be adjusted to conform with the other process conditions in the centrifugal contactor 52. The separated wax at the high gravity end of the zone 61, due to the high pressure within the zone 61, is ultimately extruded into the conduits 71 and therefrom through the annular space which surrounds the central bore of the trunnion 55 to exit into the line 45. In further clarification of the manner in which the contactor 52 operates in separating and withdrawing wax as a "solid" cake or as a propane slurry and referring to FIG. 2 of the drawings, the waxy slurry enters from the line 53 and is discharged through the short conduit 53' to a region of the separation zone 61 somewhere between the hub 60 and the outer ring 57 where the gravity multiplying effects are sufficient to initiate the separation of the wax. The rotor 47 as it rotates develops centrifugal force which causes the wax to move towards the outer ring 57 from whence it must travel through the conduits 71 back to the trunnion 55 and out of the contactor 52 through the line 45. Since the wax is heavier than the contents of the separation zone 61, a force equal to the density difference multiplied by the gravity multiplying factor is required to flow the wax back to the trunnion 55. To this force must be added the friction resistance to the flow of the "plastic" wax-propane solid solution. If the wash propane is introduced near the ring 57 and if the flow of dewaxed oil out of the line 65 is controlled so as to allow only a part of the wash propane to escape by that route then the wax will discharge as a slurry of crystals in the remaining wash propane. Under these conditions the gravity of the slurry traveling back to the trunnion 55 will be nearly the same as the contents of the zone 61 and the force will be correspondingly small. Furthermore, the friction resistance to flow will be negligible. Hence, there will be virtually no difference in pressure between the slurry inlet, the dewaxed oil outlet and the wax outlet under these conditions. The line 45 is relatively short so that the resistance to flow offered thereby is not excessive. After passing through the heat exchanger 43, the wax has its temperature raised to about 75° F., at which temperature while it is plastic and readily flowable it passes to the propane recovery system via line 75.

The pressure conditions in the centrifugal contactor 52, as well as the lines 53 and 68 which supply material thereto and the lines 45 and 65 which remove material therefrom, will vary to conform to the characteristics of the slurry supplied and the solid phase material thereof. With a starting material such as the lubricating oil fraction of 100° F. pour point originally mentioned, the slurry will be supplied through line 53 at a pressure of about 150 p.s.i.g. Although, depending on the material employed this line pressure may range from about 20 to 250 p.s.i.g. When wash propane is employed, the pressure in line 68 will preferably be in excess of 150 p.s.i.g., and will be controlled to overcome the back pressure in the wax line 45. The back pressure in the line 65 with the same raw material mentioned above, when kept at about 100 p.s.i.g. will produce a clean washed wax of excellent character. However, this pressure may be varied from about 20 to 250 p.s.i.g., depending on the results desired. With the line pressures just set forth the pressure in line 45 will be about 120 p.s.i.g. This pressure should be at least be high enough to extrude the cold wax solution and may range as high as 250 p.s.i.g. When it is desired to remove the wax as a propane-oil free wax slurry the pressure in line 68 will be in the order of .5 p.s.i.g. lower than the inlet pressure depending on the proportion of propane to wax desired in the slurry.

The warmed wax, after it leaves the heat exchanger 43, passes through line 75 to the first of the wax solution evaporators 76 and 77. In both of these evaporators the wax solution undergoes indirect heat exchange with steam. In evaporator 76 low pressure steam in the order of 10 pounds gauge is employed, whereas in evaporator 77 high pressure steam of about 150 pounds gauge is employed. The wax is maintained at about 285 p.s.i.g. in evaporator 76 and about 275 p.s.i.g. in evaporator 77. The bulk of the propane content of the wax will be liberated in evaporators 76 and 77. This propane enters the line 78 which conducts it to the line 34 where it is united with the propane at the propane outlet of the compressor 32. The wax leaves evaporator 76 at about 180° F. through line 79 and leaves evaporator 77 through line 80 at about 250° F. Line 80 conducts the liquid wax to the wax stripper 81 which is a conventional elongated vessel having a plurality of spaced trays therein. The wax is introduced at the top of the vessel 81 and courses over the trays and is thereon contacted directly with live steam which enters through steam inlet provided at the lower end of vessel 81. The propane stripped wax leaves the vessel 81 through the line 82 which passes it to storage. The steam-propane vapors leave the wax stripper through the line 83 which opens into the line 84 that conducts them to the bottom of the condenser vessel 85. The vessel 85 is conventional and includes a plurality of spaced trays. Water is admitted to the top of the vessel 85 through the line 86. The water contacts the rising steam-propane mixture and condenses the steam content thereof. The condensate together with the condensing water, pass to sewer or other disposal through the bottom line 87. The steam free propane passes through the line 88 to the drier 89 wherein its moisture content is removed. The dry propane passes from drier 89 into the line 29 and from there to the compressor 32 in the manner heretofore described.

The dewaxed oil solution is conducted through the line 65 to the drum 90 whereat its pressure is reduced to zero p.s.i.g. while its temperature remains at about −40° F. From the drum 90 the dewaxed oil solution passes to the inlet of the pump 91 wherein its pressure is raised as required for circulation through the remainder of the equipment elements in which it is processed. A line 92 connects line 65 to line 40 and bypasses drum 90 and pump 91. The flow through line 92 will adjust itself as the pressure in line 65 demands. By flow through the heat exchangers 39, 19 and 35, the dewaxed oil solution has its temperature raised to about 140° F. The line 93 leads the thus heated dewaxed oil solution from the heat exchanger 35 to the first of the dewaxed oil solution evaporators 96 and 97. The dewaxed oil solution in the evaporator 96 is heated by low pressure steam, as for instance steam at 10 pounds gauge and has its temperature raised to about 180° F., while the pressure is maintained at about 285 p.s.i.g. The propane evaporated in evaporator 96 is passed into the line 98 which opens into line 78. The partly depropanized dewaxed oil solution flows from evaporator 96 into evaporator 97 through the line 99. In evaporator 97 high pressure steam is employed, for instance steam at about 150 pounds gauge, to raise the solution temperature to about 250° F. at a pressure of about 275 p.s.i.g. The liberated propane flows through line 100 to enter the line 78. The dewaxed oil solution leaves evaporator 97 at about 250° F. through the line 101 which conducts it to the upper end of the dewaxed oil stripper vessel 102. The stripper 102 is conventional and includes a plurality of trays over which the dewaxed oil courses. Steam is introduced into the bottom of the stripper and contacts the oil flowing downwardly therein to evaporate the residual propane therefrom. The propane steam mixture leaves the stripper 102 through the line 103 which opens into the line 84. The dewaxed depropanized oil leaves the stripper 102 through the line 104 which conducts it to storage. If desirable, the dewaxed oil product may be cooled to ambient temperatures by flow through a suitable heat exchanger.

As a specific example of the dewaxing operation carried out in accordance with the teachings of this invention, the waxy charge is supplied to the line 10 at the rate of 2100 barrels per stream day (b.p.s.d.). The waxy charge is a lubricating oil fraction having a pour point in the neighborhood of 100° F. and is supplied at a temperature of 174° F. Liquid propane at 110° F. is intermixed with the oil charge in line 12 at the rate of 1000 b.s.p.d. This charge of 3100 b.p.s.d. of propane-oil solution is heated to 150° F. in the solution in heater 17 and after complete solution of the charge components in this propane, is cooled in exchanger 19 to about from 80° to 100° F. The pump 25 supplies 10,523 b.p.s.d. of liquid propane at about −40° F. to the original propane solution. This dilution reduces the temperature of the waxy oil charge-propane solution to about −15° F. The flash chiller 26 is operated at zero p.s.i.g. to provide a slurry at −40° F. The wax component of this slurry will be fine, particle size but a higher gravity than that of the liquid phase of the slurry. In the flash chiller 26, 14,405 pounds per hour of propane will be evaporated. The pump 51 withdraws a slurry comprising 8,728 b.p.s.d. of liquid and 843 b.p.s.d. of solid material. The flow controller 54 is set to provide a pressure of 500 p.s.i.g. in line 53. When the wax is washed with propane prior to removal from the contactor 52 the line 68 will supply 2,100 b.p.s.d. of propane and the flow controller 70 is set to maintain a pressure of about 500 p.s.i.g. The flow control 66 of line 65 is set to maintain a back pressure of 400 p.s.i.g. at its inlet side to provide for the passage of 9,728 b.p.s.d. of dewaxed oil solution into the line 65. The dewaxed oil solution after having its complement of propane removed in evaporators 96 and 97 and in the stripper 102, provides a yield of about 0° F. pour point dewaxed oil to storage of 1,680 b.p.s.d. Under these conditions 1,943 b.p.s.d. of propane-wax solution enters the line 45 at a pressure of 300 p.s.i.g. This wax product after having its propane complement removed therefrom in evaporators 76 and 77 and in wax stripper 81, provides 420 b.p.s.d. yield of depropanized wax to wax storage. The depropanizing of the wax solution and the dewaxed oil will provide 66,154 pounds of vaporous propane per hour while the propane stripping of the wax and the dewaxed oil provides 3,019 pounds of vaporous propane per hour. The flash drum 23 provides 17,300 pounds of vaporous propane per hour and the flash chiller 26 provides 14,405 pounds of vaporous propane per hour. Thus, a total of 100,878 pounds of propane vapor per hour is supplied to the heat exchanger 35 and the condenser 37 and is the equivalent of the 14,020 b.p.s.d. of liquid propane supplied out of storage drum 13.

When it is desired to produce a wax product having the character of slack wax, the feed of wash propane through the line 68 is discontinued and the quantity of propane supplied to the flash drum 23 is correspondingly adjusted. The quantity of dewaxed oil solution withdrawn through the line 65 will be reduced by about 2100 b.p.s.d. The pressure conditions within the contactor 52 will not materially change in this mode of carrying forward the invention.

When it is desired to produce a washed wax-propane slurry as a final product the quantity of propane admitted through the line 68 will be raised by about 1000 to 2000 b.p.s.d., and the quantity of propane supplied to the flash drum 43 will be increased accordingly. By reason of the augmented propane additional material changes are necessary in the back pressures of feed pressures of the lines connected to the contactor 52.

It will be understood that the foregoing example is an example only and that the process is not to be restricted to the data given in it since the steps of the process disclosed allow for a substantial range, many of which are recited in the specification.

I claim:

1. The method of removing relatively high melting point wax-like materials from oils which comprises forming a slurry having as the solid phase said unwanted high melting point materials in small particle form and as the liquid phase of measurably less density the desired oil product in solution in a solvent, passing said slurry through an elongated contact zone, subjecting said slurry while in said zone to gravity multiplying forces which progressively increase in the direction of the zone outlet end to progressively multiply the density difference between said solid phase and said liquid phase to promote movement of said solid phase particles away from the inlet end of said zone and toward the outlet end of said zone to thus displace liquid phase material and promote its movement toward the inlet end of said zone, contacting said slurry in its movement through said zone with extended surface to separate liquid phase increments from solid phase particles, introducing liquid solvent at the outlet end of said zone, said slurry supplied to said inlet end of said zone under the pressure required to progress the components of said slurry through said zone adjusting the flow of liquid phase material from said inlet end to provide flow of a portion of the introduced liquid solvent through said zone in a direction countercurrent to that of the solid phase particles through said zone and the remainder of said introduced liquid solvent in a direction concurrent to that of the solid phase particles.

2. The method of removing unwanted relatively high melting point wax-like materials from oils which comprises, dissolving a charge of oil in a normally gaseous solvent at a temperature above the pour point of the oil charge and at a pressure sufficient to maintain said solvent liquid, diluting the oil-solvent solution by addition of said solvent in the liquid phase and at a temperature in the order of the atmospheric boiling point thereof to lower said solution to a temperature in the order of the pour point of the desired oil product, rapidly evaporating solvent from said diluted solution to reduce its temperature to a temperature in the order of the atmospheric boiling point of said solvent and sufficient for solidification of substantially the whole of said unwanted high melting point materials to provide a slurry comprising a liquid phase of solvent-oil solution substantially free of high melting point materials and a solid phase consisting of said high melting point materials in the form of small crystal-like particles of a density measurably greater than that of said liquid phase, passing said slurry under elevated pressure through an elongated contact zone, subjecting said slurry while in said zone to gravity multiplying forces which progressively increase in the direction of the zone outlet end to progressively multiply the density difference between said solid phase and said liquid phase to promote movement of solid phase particles away from the inlet end of said zone and toward the outlet end of said zone and to thus displace liquid phase material and promote its movement toward the zone inlet end, contacting said slurry in its movement through said zone with an extended surface to separate liquid phase increments from solid phase particles, supplying a stream of said solvent at a temperature not higher than the pour point of the finally desired oil product in the region of the outlet end of said zone at a pressure at least equal to the static pressure in said zone for passage through the separated solid phase particles at the outlet end of said zone for removal of oil from said solid particles, and removing the separated solid phase particles from said outlet end of said zone and separated liquid phase material from the inlet end of said zone, the volume of said stream of solvent supplied in the region of the outlet end of said zone and the pressure at which said stream is supplied being controlled to flow a portion of said stream through said zone to exit therefrom at the inlet end thereof with the separated liquid phase material and to flow the other portion of said stream with said separated solid phase particles to the outlet end of said zone for removal with said separated solid phase particles.

References Cited in the file of this patent

UNITED STATES PATENTS

| | | |
|---|---|---|
| 2,006,011 | Atwell | June 25, 1935 |
| 2,097,999 | Dons et al. | Nov. 2, 1937 |
| 2,106,964 | Wells | Feb. 1, 1938 |
| 2,172,320 | Jones | Sept. 5, 1939 |
| 2,261,724 | Holm | Nov. 4, 1941 |
| 2,332,284 | Wiggin | Oct. 19, 1943 |
| 2,670,132 | Podielniak | Feb. 23, 1954 |